(12) United States Patent
Cheng et al.

(10) Patent No.: US 8,622,600 B2
(45) Date of Patent: Jan. 7, 2014

(54) BACKLIGHT MODULE AND DISPLAY DEVICE USING THE SAME

(75) Inventors: Ching-Hung Cheng, Hsin-Chu (TW); Ta-Jen Huang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 245 days.

(21) Appl. No.: 13/293,202

(22) Filed: Nov. 10, 2011

(65) Prior Publication Data
US 2013/0033891 A1 Feb. 7, 2013

(30) Foreign Application Priority Data
Aug. 4, 2011 (TW) .............................. 100127785 A

(51) Int. Cl.
*F21V 7/04* (2006.01)
(52) U.S. Cl.
USPC ............ 362/608; 362/612; 362/622; 362/627
(58) Field of Classification Search
USPC .................................. 362/608, 612, 622, 627
See application file for complete search history.

(56) References Cited

U.S. PATENT DOCUMENTS

| 7,481,562 | B2 | 1/2009 | Chua et al. | |
|---|---|---|---|---|
| 2006/0044835 | A1* | 3/2006 | Oami | ............................ 362/624 |
| 2011/0170317 | A1* | 7/2011 | Wang et al. | .................... 362/622 |
| 2011/0187942 | A1* | 8/2011 | Cho | ............................... 348/739 |
| 2012/0063171 | A1* | 3/2012 | Lee et al. | ....................... 362/622 |

FOREIGN PATENT DOCUMENTS

| CN | 2375978 | 4/2000 |
|---|---|---|
| CN | 101725868 | 6/2010 |
| CN | 201680234 | 12/2010 |
| TW | 580550 | 3/2004 |
| TW | M341857 | 10/2008 |

* cited by examiner

*Primary Examiner* — Anh Mai
*Assistant Examiner* — Michael Santonocito
(74) *Attorney, Agent, or Firm* — WPAT, PC; Justin King

(57) ABSTRACT

An exemplary backlight module includes a frame, a light guide plate, a light source module and an optical film. The light guide plate is arranged on the frame and includes a light-incident surface and a light-emitting surface adjacent to the light-incident surface. The light source module includes a circuit board arranged between the frame and the light guide plate board, and a light emitting element arranged on the circuit board and facing the light-incident surface. The optical film includes a wavelength shifting portion arranged between the light emitting element and the light guide plate, a second extending portion arranged between the light guide plate and the frame, and a first extending portion connected between the wavelength shifting portion and the second extending portion and arranged between the light guide plate and the circuit board. A display device equipped with the backlight module is also provided.

20 Claims, 2 Drawing Sheets

BACKLIGHT MODULE AND DISPLAY DEVICE USING THE SAME

TECHNICAL FIELD

The disclosure generally relates to a backlight module, and more particularly to a backlight module capable of providing a light source with high color saturation and a display device equipped with the backlight module.

BACKGROUND

A liquid crystal display (LCD) device is primarily structured by an LCD panel and a backlight module. Because the injected liquid crystal molecules in the LCD panel are not able to emit lights by themselves, so it is necessary to use a surface light source provided by the backlight module for illuminating the LCD panel so as to achieve desired display effect. Therefore, the backlight module accordingly plays an important role in the LCD device.

At present, most of the backlight modules use cold cathode fluorescent lamps (CCFLs) as their light sources. However, in response to an increasing demand in market of lighter and slimmer LCD devices, the backlight modules also need to be designed to be lighter and slimmer. Compared with the CCFLs, light emitting diodes (LEDs) have several advantages such as having a smaller size and a higher power-saving efficiency, so gradually LEDs have been replacing the CCFLs as a light source in the backlight modules.

There are several conventional designs for configuring (i.e., structuring and arranging) LEDs in a backlight module as a light source. One of them, for example, is using blue-light LEDs as a light source in a backlight module. The blue-light LEDs are used for emitting a blue light to excite phosphorus powders to produce a yellow light and thereby mixing into a white light. However, based on this designing manner, an LCD panel may have a poor color gamut thereby resulting in poor color saturation. To make an LCD panel be able to present higher color saturation, it is highly desirable to improve technologies for enhancing the color saturation of the backlight.

SUMMARY OF EMBODIMENTS

Therefore, a backlight module in accordance with an exemplary embodiment comprises a frame, a light guide plate, a light source module and an optical film. The light guide plate is arranged on the frame and comprises a light-incident surface and a light-emitting surface adjacent to the light-incident surface. The light source module comprises a circuit board and a light emitting element. The circuit board is arranged between the frame and the light guide plate. The light emitting element is arranged on the circuit board and facing the light-incident surface. The optical film comprises a wavelength shifting portion, a first extending portion and a second extending portion. The wavelength shifting portion is arranged between the light emitting element and the light guide plate. The second extending portion is arranged between the light guide plate and the frame. The first extending portion is connected between the wavelength shifting portion and the second extending portion and arranged between the light guide plate and the circuit board.

Moreover, a display device in accordance with another exemplary embodiment comprises a backlight module and a display panel. The backlight module comprises a frame, a light guide plate, a light source module and an optical film. The light guide plate is arranged on the frame and comprises a light-incident surface and a light-emitting surface adjacent to the light-incident surface. The light source module comprises a circuit board and a light emitting element. The circuit board is arranged between the frame and the light guide plate. The light emitting element is arranged on the circuit board and facing the light-incident surface. The optical film comprises a wavelength shifting portion, a first extending portion and a second extending portion. The wavelength shifting portion is arranged between the light emitting element and the light guide plate. The second extending portion is arranged between the light guide plate and the frame. The first extending portion is connected between the wavelength shifting portion and the second extending portion and arranged between the light guide plate and the circuit board. The display panel is arranged on the light-emitting surface of the light guide plate.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
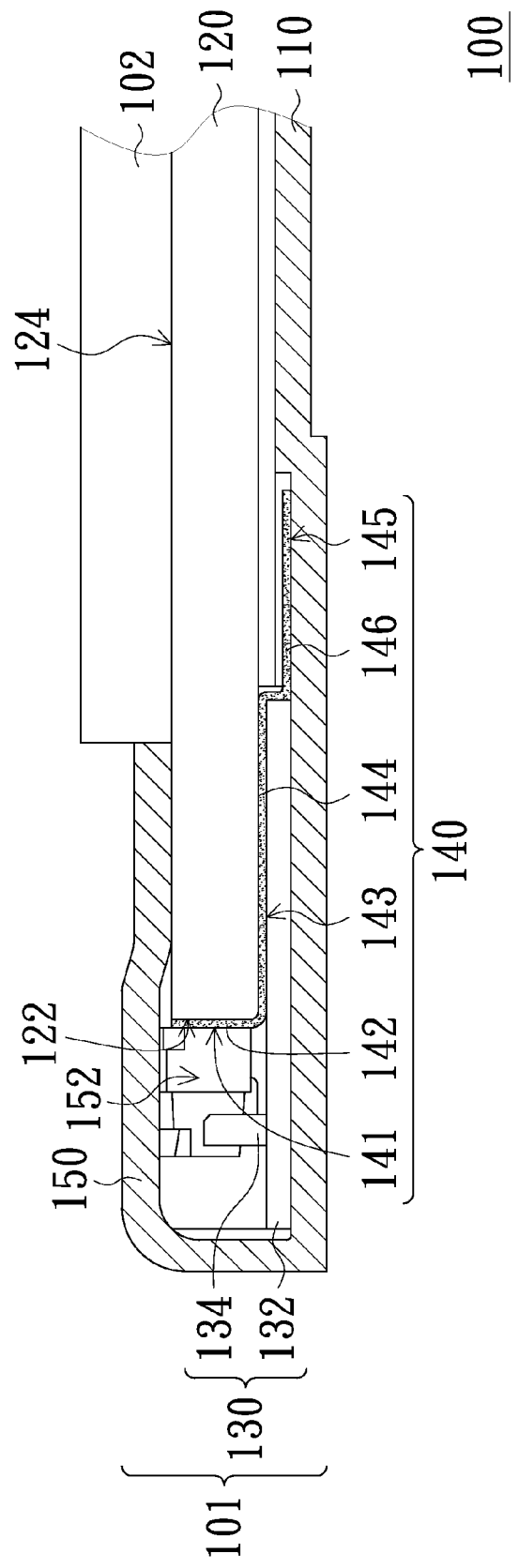
FIG. 1 is a schematic cross-sectional side view of a display device in accordance with an exemplary embodiment.

FIG. 1 is a schematic cross-sectional side view of a display device in accordance with an exemplary embodiment. As depicted in FIG. 1, the display device 100 comprises a backlight module 101 and a display panel 102. Herein, the display panel 102 for example is a liquid crystal display (LCD) panel or any non-self-luminous display panel and is arranged on the backlight module 101.

The backlight module 101 comprises a frame 110, a light guide plate 120, a light source module 130 and an optical film 140. Herein, the light guide plate 120 is arranged on the frame 110 and comprises a light-incident surface 122 and a light-emitting surface 124 adjacent to the light-incident surface 122. The light source module 130 comprises a circuit board 132 and a light emitting element 134. Herein, the circuit board 132 is arranged between the frame 110 and the light guide plate 120; and the light emitting element 134 is arranged on the circuit board 132 and facing the light-incident surface 122. In particular, the light emitting element 134 for example is a light emitting diodes (LED) for emitting white lights, and the circuit board 132 for example is equipped with one or more light emitting elements 134 (FIG. 1 exemplarily shows one light emitting element 134). Therefore, the light source module 130 in the present embodiment for example is an LED light strip.

Please still refer to FIG. 1, the optical film 140 comprises a wavelength shifting portion 142, a first extending portion 144 and a second extending portion 146. Herein, the wavelength shifting portion 142 is arranged between the light emitting element 134 and the light guide plate 120; the second extending portion 146 is arranged between the light guide plate 120 and the frame 110; and the first extending portion 144 is connected between the wavelength shifting portion 142 and the second extending portion 146 and arranged between the light guide plate 120 and the circuit board 132. In particular, the optical film 140 can be a diffusion film, a brightness enhancement film, a prism sheet or a polarizer. Additionally, the wavelength shifting portion 142 comprises a surface 141 facing the light emitting element 134, and the surface 141 for example is covered with a wavelength shifting film which comprises a material selected from a group consisting of a phosphorus powder, a fluorescent material, an organic complex material, a luminous pigment and a quantum dot (QD) material. Besides, the wavelength shifting film can also cover on the entire optical film 140; in other words, both the first and second extending portions 144, 146 of the optical film 140 can be also covered with the wavelength shifting film if necessary.

In the backlight module 101, when the light emitting element 134 emits a light, the light firstly emits to the wavelength shifting portion 142 of the optical film 140, and thereby exciting the wavelength shifting film to produce a light with specific wavelengths according to physical characteristics thereof.

For example, if the wavelength shifting film covered on the wavelength shifting portion 142 is a QD film, firstly the wavelength shifting portion 142 will excite and emit a light with corresponding wavelengths according to particles' size or other related physical structures of the QD film when is being emitted by the light emitting elements 134. Afterwards, the light produced by the QD film emits into the light guide plate 120 through the light-incident surface 122 thereof, and emits from the light-emitting surface 124 after being performed optical fractions and/or reflections by the light guide plate 120, and then emits into the display panel 102. In other words, based on the photochromics needed to be enhanced, the display device 100 of the present embodiment can correspondingly modulate the particles' size or other related physical structures of the wavelength shifting film, so that desired color saturation is obtained and presented consequently.

Moreover, the first and second extending portions 144, 146 of the optical film 140 respectively comprise a first and a second attaching surfaces 143, 145. Herein, the first attaching surface 143 is used for attaching the circuit board 132 and the second attaching surface 145 is used for attaching the frame 110. In other words, through the first and second attaching surfaces 143, 145, the optical film 140 can respectively attach to the circuit board 132 and the frame 110. Therefore, in the embodiment, the optical film 140 not only provides a function of shifting a light emitted from the light emitting element 140 to a specific wavelength thereby enhancing the color saturation to be displayed on the display panel 100, but also provides a function of fixedly attaching the circuit board 132 to the frame 110 without any extra tapes.

In addition, the backlight module 101 in the present embodiment further comprises a light shading cover 150 connected to the frame 110 and cooperatively forming an accommodation space 512 with the frame 110. Herein, the light source module 130 is arranged inside the accommodation space 152. The light shading cover 150 for example overlaps a portion of the light-emitting surface 124 of the light guide plate 120, thereby avoiding the leaking light problem which may be occurred in the backlight module 101 near the light emitting element 134.

Figure 2:
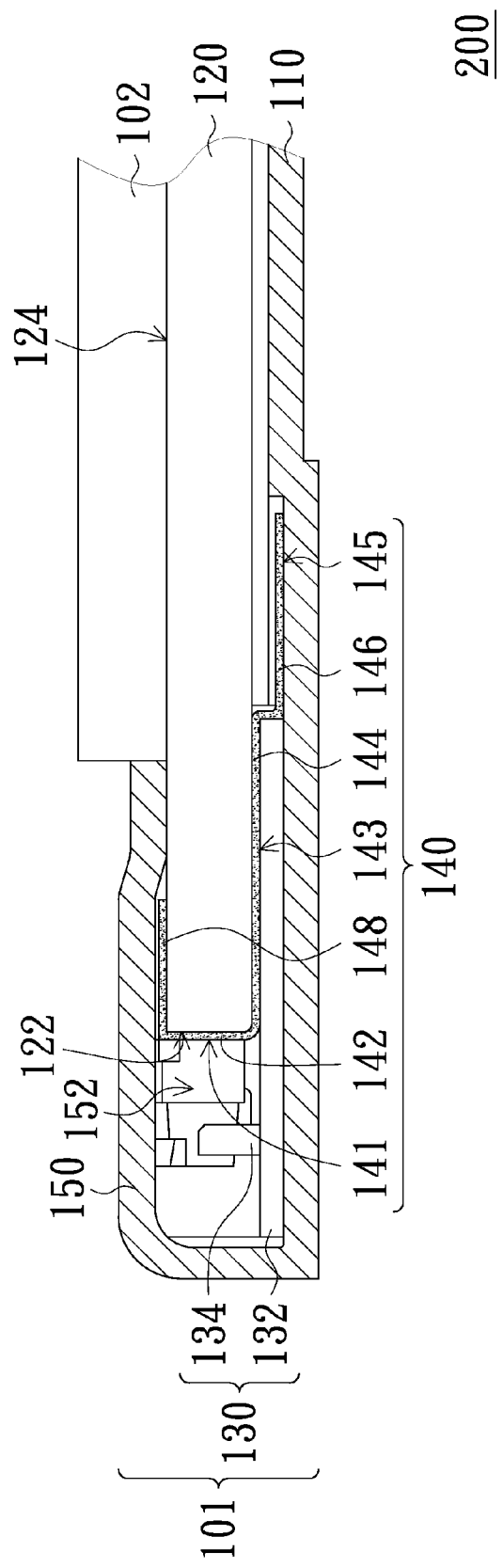
FIG. 2 is a schematic cross-sectional side view of a display device in accordance with another exemplary embodiment.

FIG. 2 is a schematic cross-sectional side view of a display device in accordance with another exemplary embodiment. It is noted that the display device 200 is similar to the display device 100 depicted in FIG. 1, so that only the different components, compared to the display device 100, in the display device 200 will be described below in detail.

As depicted in FIG. 2, the optical film 140 further comprises a third extending portion 148 extending from the wavelength shifting portion 142 to a portion of the light-emitting surface 124 of the light guide plate 120 and arranged between the light shading cover 150 and the light guide plate 120. In particular, if the optical film 140 is a diffusion film, the third extending portion 148 can be used for fogging the leakage light which is produced in an area between the light shading cover 150 and the light guide plate 120, and thereby avoiding an over-high brightness of the leakage light to disturb users to watch the displayed images. Or, the third extending portion 148 can be used for blocking the leakage light if is covered with a light-shading film.

It is noted that the third extending portion 148 can be also covered with the wavelength shifting film. In other words, the wavelength shifting film can cover the entire optical film 140 if necessary, or, just cover the wavelength shifting portion 142 only, there is no any restriction given here in the embodiment.

To sum up, because the backlight module of the present embodiment arranges an optical film with a wavelength shifting function between a light emitting element and a light guide plate, a wavelength shifting portion of the optical film can excite and emit a light with desired wavelengths according to its physical characteristics when is being emitted by the light emitting element. In other words, through modulating particulars' sizes or physical structures of the wavelength shifting portion, the light guide plate can emit a color with desired wavelengths so as enhancing the color saturation of the light provided by the backlight module. Therefore, a display device equipped with the backlight module accordingly can present images with higher color saturation.

Additionally, in the backlight module of the present embodiment, a circuit board which is electrically coupled to the light emitting element is fixedly attached to a frame through the optical film without any extra tapes, accordingly the backlight module of the present embodiment consumes less materials, so as successfully responding to the demands of LCDs with a lighter weight and a smaller size.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module comprising:
 a frame;
 a light guide plate, arranged on the frame, comprising a light-incident surface and a light-emitting surface adjacent to the light-incident surface;
 a light source module, comprising:
  a circuit board, arranged between the frame and the light guide plate; and
  a light emitting element, arranged on the circuit board and facing the light-incident surface; and
 an optical film, comprising a wavelength shifting portion, a first extending portion and a second extending portion, wherein the wavelength shifting portion is arranged between the light emitting element and the light guide plate, the second extending portion is arranged between the light guide plate and the frame, the first extending portion is connected between the wavelength shifting portion and the second extending portion and arranged between the light guide plate and the circuit board.

2. The backlight module according to claim 1, wherein the wavelength shifting portion of the optical film comprises a surface facing the light emitting element, and the surface is covered with a wavelength shifting film.

3. The backlight module according to claim 2, wherein the wavelength shifting film comprises a material selected from a group consisting of a phosphorus powder, a fluorescent material, an organic complex material, a luminous pigment and a quantum dot material.

4. The backlight module according to claim 1, further comprising a light shading cover connected to the frame and cooperatively forming an accommodation space with the frame, wherein the light source module is arranged inside the accommodation space, and the light shading cover overlaps with a portion of the light-emitting surface of the light guide plate.

5. The backlight module according to claim 4, wherein the optical film further comprises a third extending portion extending from the wavelength shifting portion to above a portion of the light-emitting surface of the light guide plate and arranged between the light shading cover and the light guide plate.

6. The backlight module according to claim 5, wherein the third extending portion of the optical film is covered with a wavelength shifting film.

7. The backlight module according to claim 6, wherein the wavelength shifting film comprises a material selected from a group consisting of a phosphorus powder, a fluorescent material, an organic complex material, a luminous pigment and a quantum dot material.

8. The backlight module according to claim 1, wherein each of the first and second extending portions of the optical film is covered with a wavelength shifting film.

9. The backlight module according to claim 1, wherein the optical film comprises a diffusion film, a brightness enhancement film, a prism sheet or a polarizer.

10. The backlight module according to claim 1, wherein the first and second extending portions of the optical film respectively have a first and a second attaching surfaces, and the first and second attaching surfaces are respectively attached to the circuit board and the frame.

11. A display device comprising:
a backlight module, comprising:
  a frame;
  a light guide plate, arranged on the frame, comprising a light-incident surface and a light-emitting surface adjacent to the light-incident surface;
  a light source module, comprising:
    a circuit board, arranged between the frame and the light guide plate; and
    a light emitting element, arranged on the circuit board and facing the light-incident surface; and
  an optical film, comprising a wavelength shifting portion, a first extending portion and a second extending portion, wherein the wavelength shifting portion is arranged between the light emitting element and the light guide plate, the second extending portion is arranged between the light guide plate and the frame, the first extending portion is connected between the wavelength shifting portion and the second extending portion and arranged between the light guide plate and the circuit board; and
a display panel, arranged on the light-emitting surface of the light guide plate.

12. The display device according to claim 11, wherein the wavelength shifting portion of the optical film comprises a surface facing the light emitting element, and the surface is covered with a wavelength shifting film.

13. The display device according to claim 12, wherein the wavelength shifting film comprises a material selected from a group consisting of a phosphorus powder, a fluorescent material, an organic complex material, a luminous pigment and a quantum dot material.

14. The display device according to claim 11, further comprising a light shading cover connected to the frame and cooperatively forming an accommodation space with the frame, wherein the light source module is arranged inside the accommodation space, and the light shading cover overlaps a portion of the light-emitting surface of the light guide plate.

15. The display device according to claim 14, wherein the optical film further comprises a third extending portion extending from the wavelength shifting portion to above a portion of the light-emitting surface of the light guide plate and arranged between the light shading cover and the light guide plate.

16. The display device according to claim 15, wherein the third extending portion of the optical film is covered with a wavelength shifting film.

17. The display device according to claim 16, wherein the wavelength shifting film comprises a material selected from a group consisting of a phosphorus powder, a fluorescent material, an organic complex material, a luminous pigment and a quantum dot material.

18. The display device according to claim 11, wherein each of the first and second extending portions is covered with a wavelength shifting film.

19. The display device according to claim 11, wherein the optical film comprises a diffusion film, a brightness enhancement film, a prism sheet or a polarizer.

20. The display device according to claim 11, wherein the first and second extending portions of the optical film respectively comprise a first and a second attaching surfaces, and the first and second attaching surfaces are respectively attached to the circuit board and the frame.

* * * * *